(12) United States Patent
Burns et al.

(10) Patent No.: US 7,730,279 B2
(45) Date of Patent: *Jun. 1, 2010

(54) SYSTEM FOR LIMITING THE SIZE OF A LOCAL STORAGE OF A PROCESSOR

(75) Inventors: Adam P. Burns, Austin, TX (US);
Michael N. Day, Round Rock, TX (US);
Brian Flachs, Georgetown, TX (US); H. Peter Hofstee, Austin, TX (US);
Charles R. Johns, Austin, TX (US);
John Liberty, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/429,676

(22) Filed: Apr. 24, 2009

(65) Prior Publication Data

US 2009/0204781 A1 Aug. 13, 2009

Related U.S. Application Data

(63) Continuation of application No. 11/208,376, filed on Aug. 19, 2005, now Pat. No. 7,533,238.

(51) Int. Cl.
*G06F 12/00* (2006.01)

(52) U.S. Cl. ................ 711/172; 711/117; 711/118; 711/170; 711/171; 711/200; 711/201; 710/5; 710/6; 710/7; 710/8; 710/9; 710/33; 710/34; 710/36; 710/39; 712/32; 712/33; 712/34; 712/220; 712/225; 713/1; 713/2

(58) Field of Classification Search ......... 711/200–201, 711/170–172; 710/5–9, 33–34, 36, 39; 712/32–34; 712/220, 225; 713/1–2
See application file for complete search history.

(56) References Cited

U.S. PATENT DOCUMENTS

| 5,440,705 | A | 8/1995 | Wang et al. |
| 5,584,004 | A | 12/1996 | Aimoto et al. |
| 5,655,139 | A | 8/1997 | Thomson et al. |
| 7,139,871 | B2 | 11/2006 | Mizuno |
| 7,213,081 | B2 * | 5/2007 | Narasimhamurthy et al. .. 710/2 |
| 2005/0257010 | A1 * | 11/2005 | Jones et al. ................ 711/133 |
| 2006/0095669 | A1 | 5/2006 | Day et al. |

FOREIGN PATENT DOCUMENTS

JP 5-108473 4/1993

OTHER PUBLICATIONS

"Memory-mapped I/O", retrieved from http://en.wikipedia.org/wiki/Memory-mapped_IO as archived by www.archive.org on Apr. 28, 2005.

* cited by examiner

*Primary Examiner*—Tuan V Thai
*Assistant Examiner*—Zhuo H Li
(74) *Attorney, Agent, or Firm*—Francis Lammes; Stephen J. Walder, Jr.; Matthew B. Talois

(57) ABSTRACT

A system for limiting the size of a local storage of a processor is provided. A facility is provided in association with a processor for setting a local storage size limit. This facility is a privileged facility and can only be accessed by the operating system running on a control processor in the multiprocessor system or the associated processor itself. The operating system sets the value stored in the local storage limit register when the operating system initializes a context switch in the processor. When the processor accesses the local storage using a request address, the local storage address corresponding to the request address is compared against the local storage limit size value in order to determine if the local storage address, or a modulo of the local storage address, is used to access the local storage.

20 Claims, 6 Drawing Sheets

SYSTEM FOR LIMITING THE SIZE OF A LOCAL STORAGE OF A PROCESSOR

This application is a continuation of application Ser. No. 11/208,376, filed Aug. 19, 2005, status awaiting issue publication.

BACKGROUND OF THE INVENTION

1. Technical Field

The present invention relates generally to an improved data processing system and method. More specifically, the present invention is directed to a system and method for limiting the size of a local storage of a processor.

2. Description of Related Art

The Cell Broadband Engine (CBE), a multi-core processor architecture available from International Business Machines, Inc., describes a local storage that is specific to each synergistic processing unit (SPU). The main purpose of this local storage is to act as the storage space for instructions and data for a given SPU. The Cell Broadband Engine Architecture (CBEA) does not limit the local storage address to the physical size of the local storage. For addresses greater than the physical size of the local storage, the CBEA defines that the address wraps to the beginning of the physical memory. It is therefore possible that applications running on the SPU may be constructed in such a way as to be dependent upon the local storage size. This could especially be true of software that was developed for a CBE compliant processor with a smaller local storage or legacy software that was developed for a different data processing system architecture. In addition, compilers that are optimizing code to run on CBE compliant processors will also need this information in order to properly break up tasks to run on the SPUs. The CBE, however, does not specify a required size for this local storage.

SUMMARY OF THE INVENTION

In view of the above, it would be beneficial to have a facility to control the size of a local storage such that software programs that are dependent upon the local storage size can run on a multitude of Cell Broadband Engine Architecture (CBEA) compliant processors. The present invention provides such a facility for controlling the size of a local storage of a processor.

With the present invention, a facility is provided on the processors of a multiprocessor system, such as the CBE, for setting a local storage size limit in a local storage limit register. This facility is a privileged facility and thus, can only be accessed by the operating system running on a control processor in the multiprocessor system or the associated processor itself. The operating system sets the value stored in the local storage limit register when the operating system initializes the context (i.e. the state) of an application running in the processor.

When the processor accesses the local storage using a local storage address, the address is compared against the local storage limit size value stored in the local storage limit register. If the local storage address is less than the local storage limit size, then the local storage address is used to access the appropriate portion of the local storage. If the local storage address is equal to or greater than the local storage limit size, then a modulo (mod) of the local storage address with respect to the local storage limit size is used to access an appropriate portion of the local storage. In effect, when the local storage limit size is reached, the local storage address wraps back to a starting address of the local storage and accesses instructions/data previously stored in the local storage. The local storage limit register provides an operating system with the ability to limit the available size of local storage. Limiting the local storage size also provides backwards compatibility for applications written for a smaller local storage.

In one exemplary embodiment, a method, computer program product, and apparatus are provided in which a size limit value is set for a local storage in a local storage limit register of a data processing system. A request may be received to access the local storage and the request may include a request address. The request address may be compared to the size limit value stored in the local storage limit register and the local storage may be accessed using an access address determined based on the comparison. If the request address is less than a maximum address of the local storage determined based on the size limit value, then the access address may be the request address. If the request address is not less than a maximum address of the local storage determined based on the size limit value, then the access address may be a modulo of the request address based on the size limit value.

The request address may be a local storage address and the request may be received from a processor associated with the local storage. The comparing of the request address to the size limit value may include comparing the local storage address to a maximum address for the local storage determined based on the size limit value. Alternatively, the request address may be an effective address and the request may be received from a device external to the local storage and the associated processor.

In addition to the above, the mechanism of the present invention may convert an effective address to a local storage address prior to comparing the request address to the size limit value and accessing the local storage. Moreover, setting a size limit value for the local storage in a local storage limit register of the data processing system may comprise receiving, from a control processor in the data processing system, an instruction to set the size limit value for the local storage and storing the size limit value as a value specified by the instruction from the control processor.

The local storage limit register may be a privileged register that may only be written to by a control processor of the data processing system. The data processing system may be a multiprocessor broadband engine data processing system. Furthermore, the mechanisms of the present invention may be implemented in a memory flow control unit associated with the processor.

In addition to the above, the apparatus of the present invention may comprise a processor, a local storage coupled to the processor, a memory flow control unit coupled to the processor and the local storage, and a local storage limit register coupled to the memory flow control unit.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
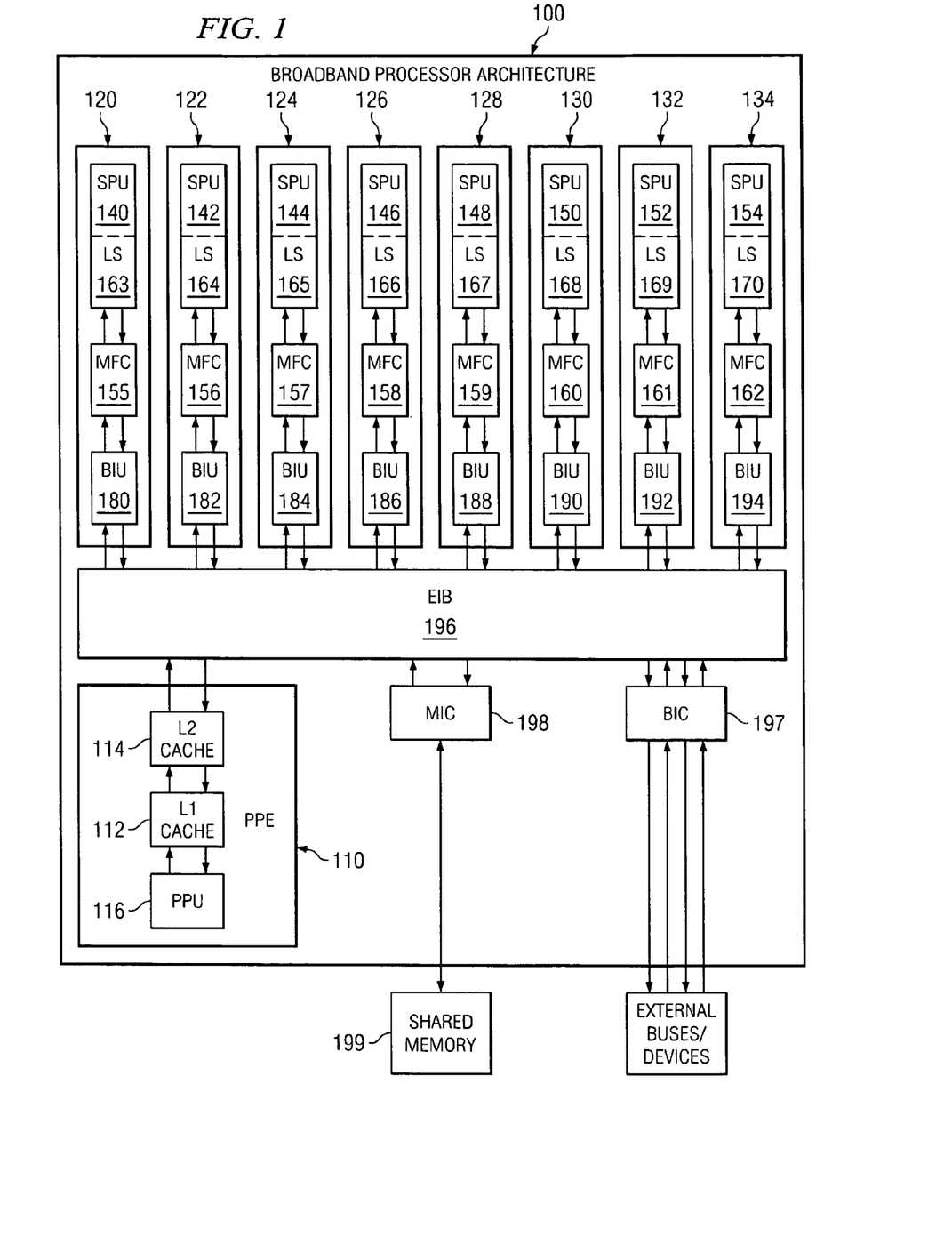
FIG. 1 is an exemplary block diagram of a data processing system in which aspects of the present invention may be implemented.

FIG. 1 is an exemplary block diagram of a data processing system in which aspects of the present invention may be implemented. The exemplary data processing system shown in FIG. 1 is an example of the CELL Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 160-174, and an interface unit 180-194. The local memory or store 160-174, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 160-174. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

Figure 2:
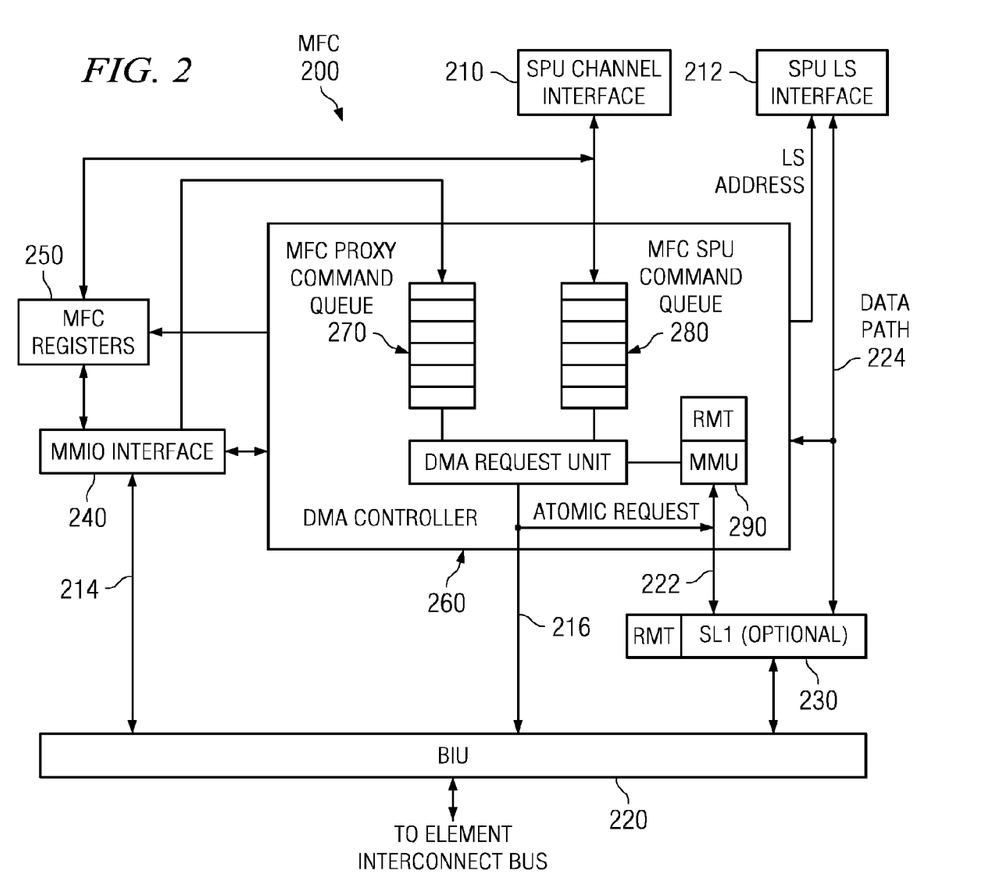
FIG. 2 is an exemplary block diagram of a memory flow control (MFC) unit in accordance with one exemplary embodiment of the present invention.

FIG. 2 is an exemplary block diagram of a typical memory flow control (MFC) unit 200 in accordance with an exemplary embodiment of the present invention. In this exemplary embodiment, the MFC 200 has two interfaces 210 and 212 to the SPU, two interfaces 214 and 216 to the Bus Interface Unit (BIU) 220, and two interfaces 222 and 224 to an optional SL1 cache 230. The SPU interfaces 210 and 212 are the SPU channel interface 210 and the SPU local storage interface 212. The SPU channel interface 210 allows the SPU to access MFC facilities and to issue MFC commands. The SPU local storage interface 212 is used by the MFC 200 to access the local storage in the SPU. One interface 216 to the BIU 220 allows Memory Mapped I/O (MMIO) access to the MFC facilities. This interface 216 also allows other processors to issue MFC commands. Commands issued using MMIO are referred to as MFC proxy commands.

The interfaces 222 and 224 to the SL1 cache are mainly for data transfers. One interface 222 is used by the MFC 200 for access to the address translation tables in main storage and the other 224 is used for the transfer of data between main storage and local storage.

As shown in FIG. 2, the main units in a typical MFC include a memory mapped input/output (MMIO) interface 240, MFC registers 250, and DMA controller 260. The MMIO interface 230 maps the MFC facilities of the SPU into the real address space of the system. This allows access to the MFC facilities from any processor, or any device in the system. In addition, the MMIO interface 240 may be configured to map the local storage of the SPU into the real address space. This allows direct access to the local storage from any processor or any device in the system, enabling local-store-to-local-store transfers and the ability for I/O devices to directly access the local storage domain of an SPU.

The MFC registers unit 250 contains most of the MFC facilities. Of particular importance to the present invention, the MFC registers unit 250 includes an SPU local storage limit register facility. With this facility, privileged software may set a limit on the size of the local storage of the SPE, as will be described in greater detail hereafter.

The synchronization and the transfer of data is generally the responsibility of the DMAC 260 within the MFC 200. The DMAC 260 can move data between the local storage of an SPU and the main storage area. Optionally, the data can be cached in the SL1 cache.

The SPE and PPE instruct the MFC 200 to perform these DMA operations by queuing DMA command requests to the MFC through one of the command queues 270 and 280. Commands issued by an SPE are queued to the MFC SPU command queue 270. Commands issued by a PPE are queued to the MFC proxy command queue 280. The MFC uses a memory mapping unit (MMU) 290 to perform all MFC address translations and MFC access protection checks required for the DMA transfers.

MFC commands provide the main method that enables code executing in a SPU to access main storage and maintain synchronization with other processors and devices in the system. Commands are also provided to manage optional caches. MFC commands can either be issued by code running on the SPU, or by code running on another processor or device, such as the PPE. Code running on the associated SPU executes a series of channel instructions to issue an MFC command. Code running on other processors or devices performs a series of memory mapped I/O (MMIO) transfers to issue an MFC command to an SPE. The commands issued are queued to one of the command queues 270 and 280.

In general, commands can be queued using MMIO registers of the MFC registers unit 250, or through channel instructions executed by the associated SPU. The MMIO method is intended for use by the PPE to control the transfer of data between main storage and the associated local storage on behalf of the SPE. MFC commands that transfer data are referred to as MFC DMA commands. The data transfer direction for MFC DMA commands is always referenced from the perspective of an SPE. Therefore, commands that transfer data into an SPE (from main storage to local storage) are considered get commands, while commands that transfer data out of an SPE (from local storage to main storage) are considered put commands.

Commands that transfer data are referred to as MFC DMA commands. These commands are converted into DMA transfers between the local storage domain and main storage domain. Each MFC can typically support multiple DMA transfers at the same time and can maintain and process multiple MFC commands. Each MFC DMA data transfer command request involves both a local storage address (LSA) and an effective address (EA). The local storage address can directly address only the local storage area of its associated SPU. The effective address has a more general application in that it can reference main storage, including all the SPU local storage areas, if they are aliased into the real address space.

Referring again to FIGS. 1 and 2, with the above architecture, an operating system runs on the PPE 110 whose purpose it is to control and orchestrate the operation of the SPEs 120-134. The PPE 110, executing the operating system, initializes programs, or portions of programs, e.g., threads, to be run on each of the SPEs 120-134. When the PPE 110 causes a SPE 120-134 to perform a context switch, i.e. changes the program or portion of a program being executed by the SPE 120-134, the PPE 110 initializes the SPE 120-134 for execution of the new program or portion of a program. This initialization may involve, for example, setting values in a number of SPU control registers, i.e. registers in the MFC registers unit 250 in FIG. 2, which store values for controlling various operational characteristics of the SPE 120-134.

With the present invention, a facility is provided in the SPEs 120-134 for defining a size limit for the local storage 163-170. This facility is a privileged facility, i.e. it can only be accessed by privileged software running on the PPE 110 or SPE 120-134. In particular, this facility may only be written to by the operating system, or other privileged software, running on the PPE 110. This facility may be read by the operating system, or other privileged software, running on the PPE 110 as well as the SPE 120-134 itself, e.g., the memory flow controller (MFC), to access the local storage 163-170.

In particular, the facility of the present invention includes a local storage limit register (LSLR), which may be part of the MMIO registers in the MFC registers unit 250, and corresponding circuitry for writing to and reading from the LSLR. The PPE 110 may write a value to this LSLR, via the MMIO interface 240 to thereby control the size of the local storage associated with the SPE 120-134. This value may be, for example, an offset value, from a base address, for identifying a maximum accessible address for the local storage, the actual maximum accessible address itself, an actual size value or the like. Each SPE 120-134 may contain such a LSLR and each LSLR may be programmed with the same or different values. That is, the LSLR is unique to each SPE and a system containing multiple SPEs may have a different value in each of the SPEs.

Each time there is a context switch in the SPE 120-134, the PPE 110 has the ability to set the value stored in the LSLR for that SPE. A default value of the LSLR may be the maximum size of the local storage 163-170. A context switch is any change in the program or portion of a program, e.g., thread, that is being executed by the SPU 140-154 of the SPE 120-134. This allows the PPE 110 to set the size of the local storage 163-170 for programs or portions of a program that are sensitive to the size of the local storage 163-170.

The size limit value that is stored in the LSLR is used with each access of the local storage 163-170, whether that access is from the SPU 140-154 associated with the local storage 163-170 or from external processors, i.e. the PPE 110 or other SPEs 120-134. If the local storage 163-170 is accessed from the SPU 140-150, the local storage address is utilized. If the local storage 163-170 is accessed from an external device, such as the PPE 110 or another SPU 140-154, then the effective address is converted to a local storage address, which is then used to access the local storage 163-170. For purposes of the following disclosure, in order to avoid any confusion regarding which address is being utilized, the term "request address" will be used to refer to either the local storage address or the effective address received in an access request, depending upon which unit is attempting to access the local storage, i.e. the associated SPU or an external device. It should be noted, however, that in either case, the address that is ultimately compared against the size limit value stored in the LSLR is a local storage address that either was supplied by the SPU 140-150 or is the result of the conversion of an effective address.

As one example of using the size limit value to limit the size of the local storage, when the SPU, e.g., SPU 140, associated with the local storage, e.g., local storage 163, accesses the local storage 163 using a request address, the local storage address corresponding to the request address is compared against the local storage limit size value stored in the LSLR. If the local storage address is less than the local storage limit size, then the local storage address is used to access the appropriate portion of the local storage 163. If the local storage address is equal to or greater than the local storage limit size, then a modulo (mod) of the local storage address with respect to the local storage limit size is used to access an appropriate portion of the local storage 163. In effect, when the local storage limit size is reached, the local storage 163 wraps back to a starting address and accesses instructions/data previously stored in the local storage 163.

Figure 3A:
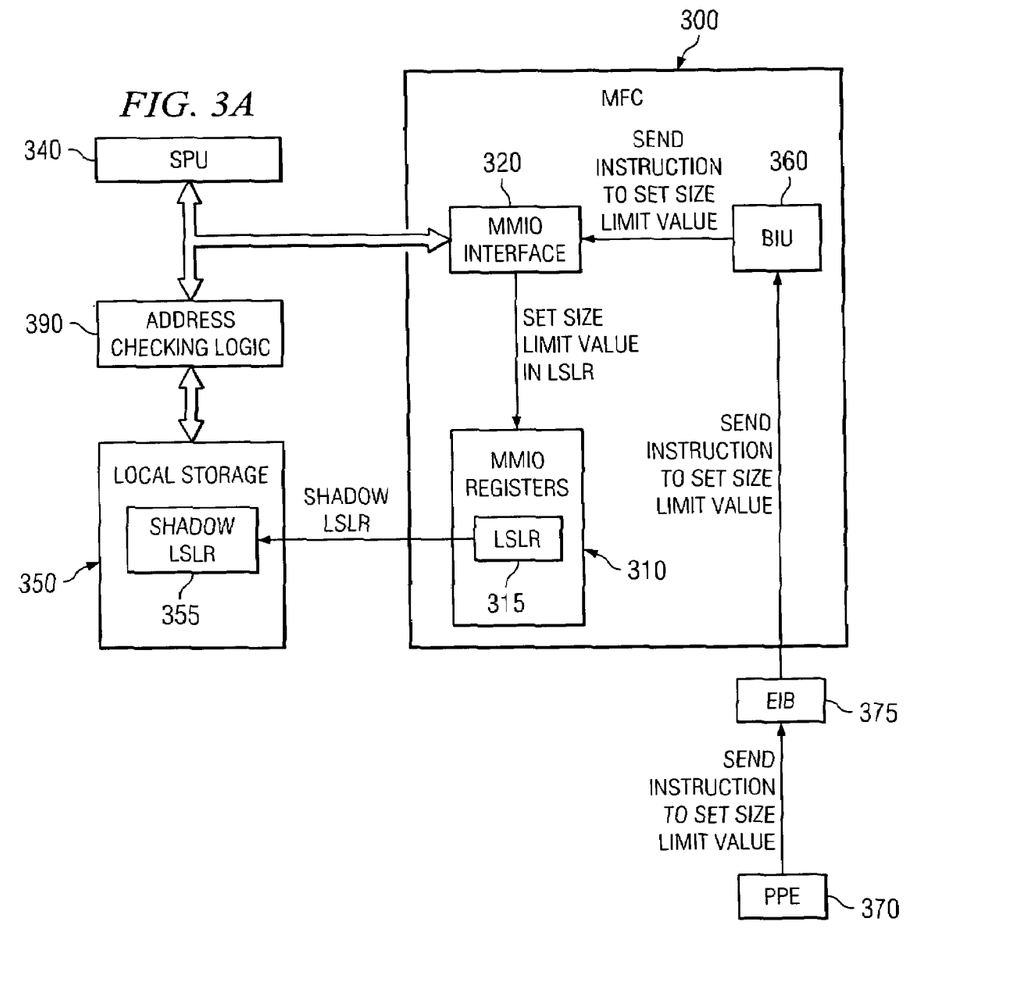
FIG. 3A is an exemplary diagram illustrating the setting of a local storage limit register in accordance with one exemplary embodiment of the present invention.

FIG. 3A is an exemplary diagram illustrating the setting of a local storage limit register in accordance with one exemplary embodiment of the present invention. As shown in FIG. 3A, in order to write a size limit value into the local storage limit register (LSLR) 315, the PPE 370 sends an instruction for setting the size limit value to the MFC 300 via the EIB 375 and the associated SPE's BIU 360. The size limit value itself may be determined by the PPE 370 based on memory constraint information provided in an application, or portion of an application, that is to be executed by the SPE.

The instruction is received from the BIU 360 in the MMIO interface 320 which interfaces with the MMIO registers 310 to thereby write the value specified in the instruction received from the PPE 370 into the local storage limit register 315. Thereafter, the value stored in the LSLR 315 is shadowed to a shadow LSLR 355 in local storage 350. The address checking logic 390 utilizes the value stored in the shadow LSLR 355 to perform checks of local storage addresses against a maximum address for the local storage 350.

This operation for storing the size limit value may be performed with each context switch of the SPE in which the MFC 300 is provided. Moreover, this operation may be performed for each context switch in each SPE of the data processing system. Thus, for example, this process may be performed in each of the eight SPEs 120-134 of the CBE 100 in FIG. 1 on an individual basis every time one of the SPEs 120-134 experiences a context switch.

Figure 3B:
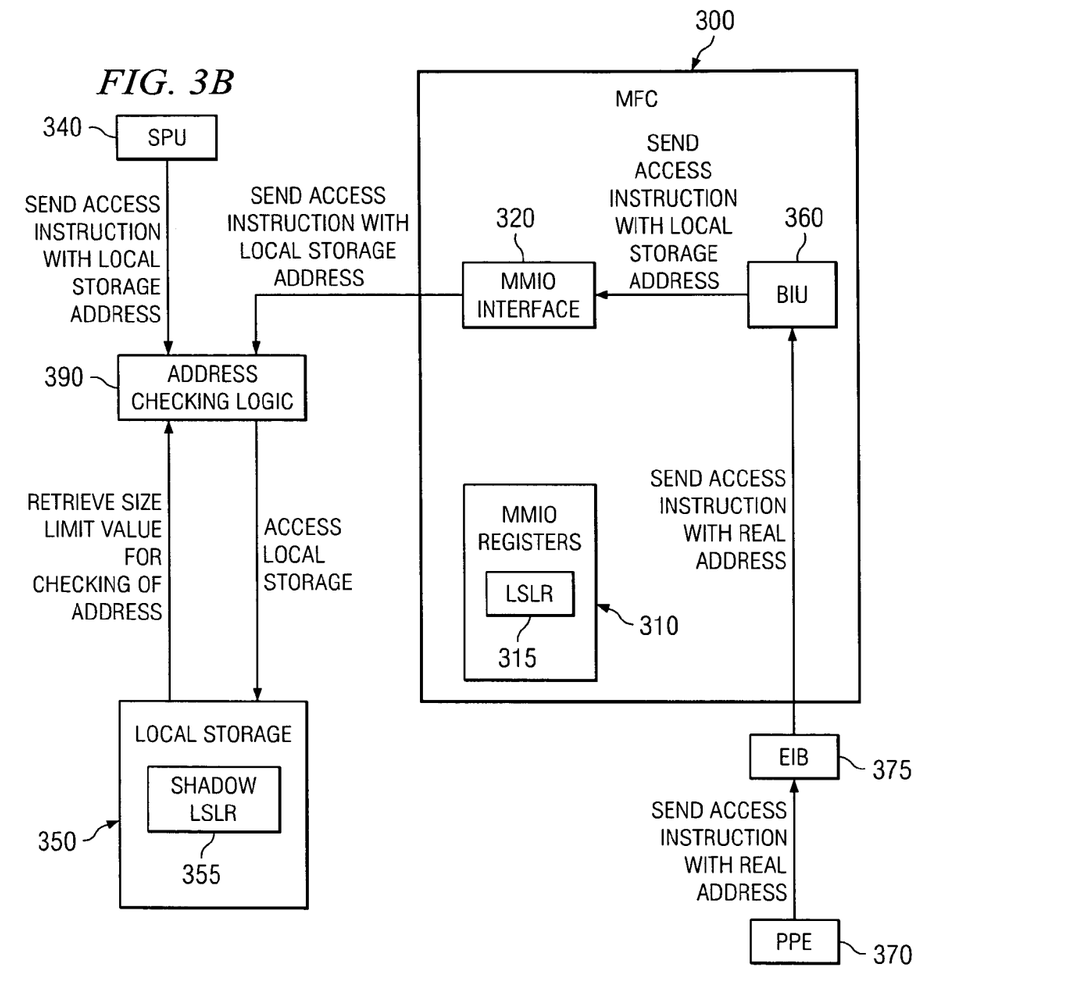
FIG. 3B is an exemplary diagram illustrating the use of a local storage limit register when accessing a local storage in accordance with one exemplary embodiment of the present invention.

FIG. 3B is an exemplary diagram illustrating the use of a local storage limit register when accessing a local storage in accordance with one exemplary embodiment of the present invention. As previously discussed above, the local storage 350 may be accessed directly by the SPU 340 using a local storage address, or may be accessed remotely by an external device, i.e. a device that is external to the SPE in which the SPU 340, local storage 350, and MFC 300 are present, by way of an effective address. Similarly, the SPU 340 may access main memory, external storage devices, or local storages of other SPUs in the data processing system via the MFC 300 using an effective address. Thus, the process for accessing the local storage 350 using a local storage address and an effective address will be described hereafter.

First, an access of the local storage 350 from the SPU 340 using a local storage address will be described. As shown in FIG. 3B, the SPU 340 sends an access instruction with a local storage address to the local storage 350 directly. This access instruction passes through address checking logic 390 which retrieves the size limit value from the shadow LSLR 355 in local storage 350 and performs a check of the local storage address against this size limit value. In particular, the size limit value is used to determine a maximum address for the local storage 350.

The local storage address is compared to the maximum address for the local storage, as identified by the size limit value, to determine what address is to be used to access the local storage 350. If the local storage address is less than the maximum address for the local storage 350, as determined based on the size limit value, then the local storage address may be used to access the local storage 350. If the local storage address is not less than the maximum address for the local storage 350, then a modulo (mod) of the local storage address based on the size limit value is used to access the local storage 350.

Next, an example implementation of the present invention will be described with regard to an instruction using an effective address to access the local storage 350. In this particular example, software running on a processor, such as the PPE 370, generates an instruction with an effective address that is converted, by the processor into a real address. The real address is used to address a local storage alias. The instruction with the real address is sent by the PPE 370, via the EIB 375, to the BIU 360 of the SPE in which SPU 340, local storage 350 and MFC 300 are present. The BIU 360 receives the instruction with the real address and, if the real address is in the local storage alias range, converts the real address into a local storage address for accessing the local storage 350.

The MMIO interface 320 outputs the access instruction with the local storage address to the local storage 350. The access instruction passes through address checking logic 390 which checks the local storage address provided in the access instruction against the size limit value stored in the shadow LSLR 355. If the local storage address is less than the maximum address as determined from the size limit value stored in the shadow LSLR 355, the instruction with the local storage address is used to access the local storage 350.

If the local storage address is not less than the maximum address for the local storage 350, then a modulo (mod) of the local storage address (LSA) based on the size limit value (LSLR) is used to access the local storage 350, i.e. LSA % LSLR, is used to access the local storage 350. This in effect provides the remainder of the modulo operation as an offset from a base address of the local storage 350 as the address for the access instruction. In this way, the local storage 350 wraps when a maximum address of the local storage 350, as determined from the size limit value, is exceeded.

As an example of the wrapping from a system perspective, assume that the local storage 350 spans an address range from a base effective address to a base effective address plus 256 KB (or max size of the local storage) (BP_Base+256 KB). If the size limit value in the LSLR 315 is set to 128 KB, there will be two copies of the data in the local storage 350 from the perspective of the external elements of the system, i.e. the PPE or other SPEs in the CBE. Thus, the data stored at an effective address of zero will have a copy at the base effective address location as well as a copy at the base effective address plus 128 KB (BP_Base+128 KB) when it is accessed at the system level, i.e. using real addressing.

If a local storage-to-local storage transfer is being performed of 256 KB of data from the local storage 350 with the size limit set at 128 KB, two copies of 128 KB each would be sent for a read transaction. For a write transaction, the second 128 KB of data would overwrite the first 128 KB.

From the SPU perspective, the local storage appears as multiple copies in the address space for the SPU. For example, the local storage address=0–(256K–1) is a first copy and local storage address=256K–(512K–1) is a second copy, etc. The key concept to grasp from the above discussion is that there are two copies of the data from both a system and a SPU perspective. However, only one actual physical copy of the data is present in the local storage 350. Once a maximum effective address is reached in the LSLR, the LSLR wraps around and starts reading the same data over again.

Figure 4:
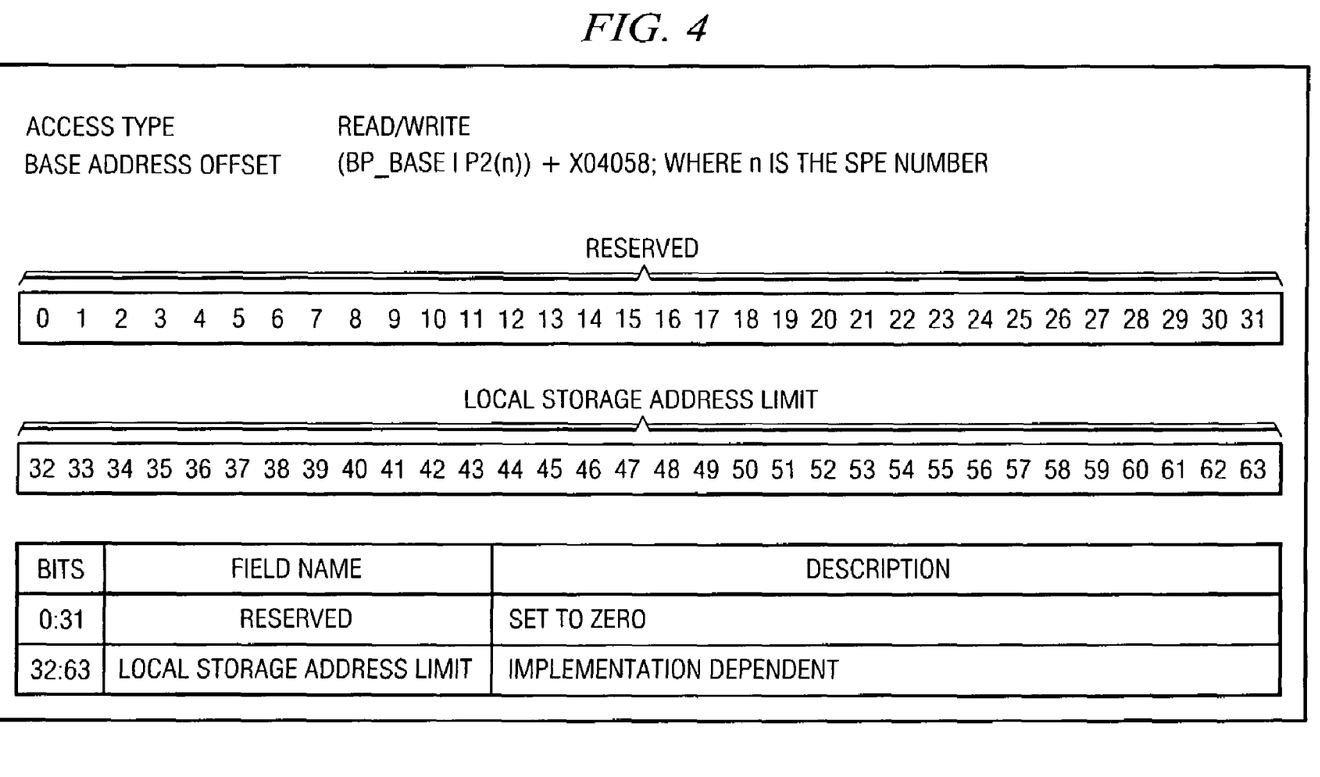
FIG. 4 is an exemplary diagram illustrating details of a local storage limit register in accordance with one exemplary embodiment of the present invention.

FIG. 4 is an exemplary diagram illustrating details of a local storage limit register in accordance with one exemplary embodiment of the present invention. As mentioned previously the local storage limit register allows the size of local storage available to an application to be artificially limited.

This register enables privileged software to provide backwards compatibility for applications that are sensitive to the size of local storage. If an application performs a load or store from the SPU that is beyond the range of the local storage limit register, the operation occurs at the wrapped address, as described previously. Access to this register is privileged.

Figure 5:
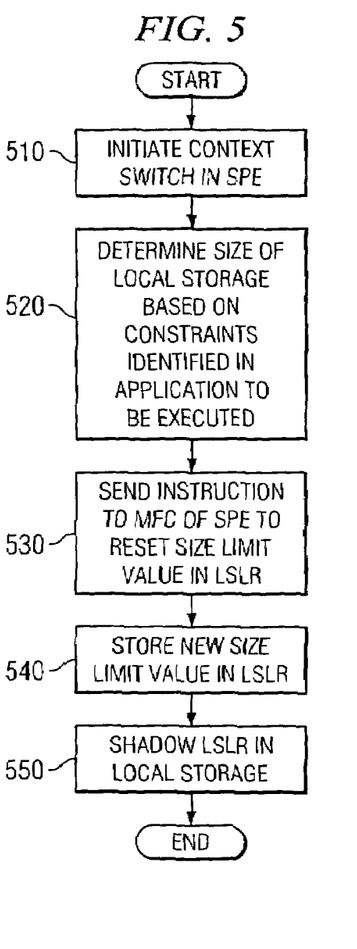
FIG. 5 is a flowchart outlining an exemplary operation for initializing a local storage limit register in accordance with one exemplary embodiment of the present invention.

FIG. 5 is a flowchart outlining an exemplary operation for initializing a local storage limit register in accordance with one exemplary embodiment of the present invention. It will be understood that each block, and combination of blocks, of the flowchart illustration in FIG. 5, and the flowchart illustration in FIG. 6 described hereafter, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Figure 6:
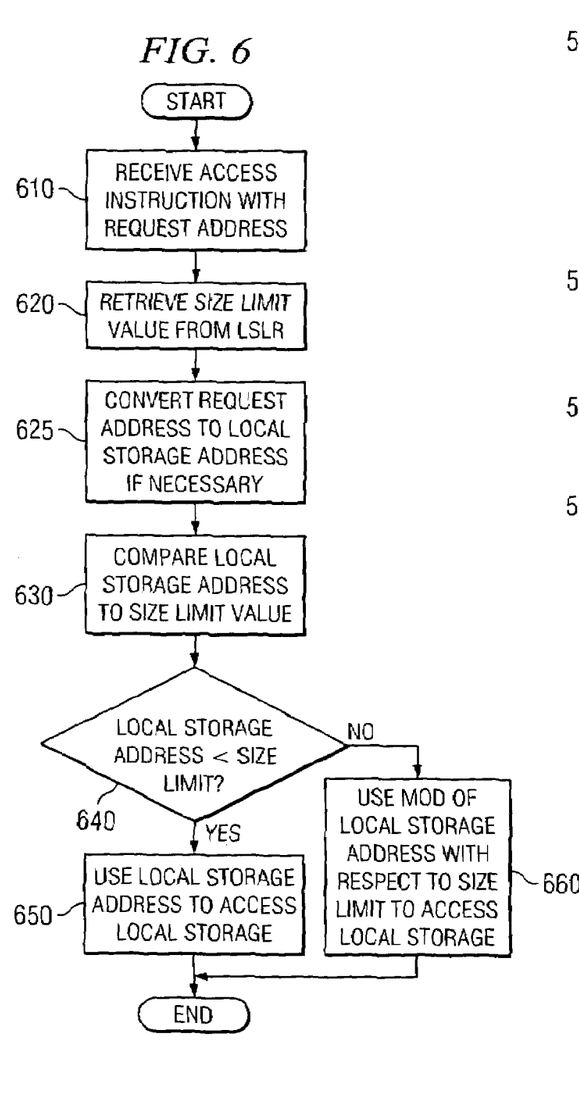
FIG. 6 is a flowchart outlining an exemplary operation for determining an address for accessing a portion of a local storage based on the local storage limit size in accordance with one exemplary embodiment of the present invention.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

As shown in FIG. 5, the operation starts by initiating a context switch in the SPE (step 510). A size of the local storage is determined based on the memory constraints, if any, specified in the application or portion of the application to be executed by the SPE (step 520). An instruction to reset the size limit value in the local storage limit register is then sent to the MFC of the SPE (step 530). The new size limit value is then stored in the local storage limit register (step 540). This new size limit value stored in the local storage limit register is then shadowed in a shadow local storage limit register of the local storage (step 550) and the operation terminates.

FIG. 6 is a flowchart outlining an exemplary operation for determining an address for accessing a portion of a local storage based on the local storage limit size in accordance with one exemplary embodiment of the present invention. As shown in FIG. 6, the operation starts by receiving an access instruction with a request address (step 610). The size limit value for the local storage is retrieved from the local storage limit register (step 620). The request address is then converted to a local storage address if necessary (step 625). As mentioned previously, the request address may be a local storage address or an effective address, depending upon the source of the access instruction. If the request address is an effective address, it may be converted to a local storage address prior to accessing the local storage. If the request address is a local storage address, conversion is not necessary.

The request address is compared to the size limit value or a maximum address determined from the size limit value (step 630). A determination is made as to whether the request address is less than the maximum address determined by the size limit value (step 640). If the request address is less than the maximum address determined by the size limit value, then the request address is used with the instruction to thereby access the local storage (step 650). If the request address is equal to or greater than the maximum address determined by the size limit value, a result of a modulo operation on the request address with respect to the size limit value is used as the address for the access instruction to access the local storage (step 660). The operation then terminates.

Thus, the present invention provides a mechanism for limiting the size of a local storage associated with a processor in a multiprocessor system. The present invention further provides mechanisms for determining an address to use to access the local storage based on the size limit set by the present invention. This address is determined such that the local storage wraps when a maximum address, as determined by the size limit value set by the present invention, is exceeded. In this way, the size of a local storage for each processor in a multiprocessor system may be individually controlled by privileged software. Moreover, the size of the local storages may be controlled so as to provide backward compatibility with legacy software that has memory constraints or is otherwise sensitive to the size of the local storage.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a RAM, memory subsystems, or other on-chip storage media. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer readable storage medium having a computer readable program stored therein, wherein the computer readable program, when executed on a computing device, causes the computing device to:

set a size limit value for each local storage in a shadow local storage limit register of an associated synergistic processing element, wherein the local storage is one of a plurality of local storages in a data processing system, wherein the data processing system comprises a plurality of synergistic processing elements, wherein each synergistic processing element in the plurality of synergistic processing elements comprises a synergistic processing unit, one of the plurality of local storages, and a memory flow controller, and wherein the computer readable program to set the size limit value for each local storage in the shadow local storage limit register of the associated synergistic processing element further causes the computing device to:

receive, in the memory flow controller of the associated synergistic processing element from a power processor element in the data processing system, an instruction to set the size limit value for the local storage;

store the size limit value in a local storage limit register of a plurality of Memory Mapped I/O (MMIO) registers as a value specified by the instruction from the power processor element; and shadow the size limit value stored in the local storage limit register to the shadow local storage limit register in the local storage;

receive a request to access the local storage of the associated synergistic processing element, wherein the request includes a request address;

compare the request address in the received request to the shadowed size limit value stored in the shadow local storage limit register of the associated synergistic processing element; and access the local storage of the associated synergistic processing element using an access address determined based on the comparison.

2. The computer program product of claim 1, wherein, if the request address is less than a maximum address of the local storage determined based on the size limit value, the access address is the request address.

3. The computer program product of claim 1, wherein, if the request address is not less than a maximum address of the local storage determined based on the size limit value, the access address is a modulo of the request address based on the size limit value.

4. The computer program product of claim 1, wherein the request address is a local storage address, and wherein the request is received from the synergistic processing unit associated with the local storage, and wherein the computer readable program causes the computing device to compare the request address by comparing the local storage address to a maximum address for the local storage determined based on the size limit value.

5. The computer program product of claim 1, wherein the request address is an effective address, and wherein the request is received from a device external to the local storage and the associated synergistic processing unit.

6. The computer program product of claim 5, wherein the computer readable program further causes the computing device to:

convert the effective address to a local storage address prior to comparing the request address to the size limit value and accessing the local storage, wherein the comparing of the request address includes comparing the local storage address to a maximum address for the local storage determined based on the size limit value.

7. The computer program product of claim 1, wherein the local storage limit register is a privileged register that may only be written to by a power processor element of the data processing system.

8. The computer program product of claim 1, wherein the data processing system is a multiprocessor broadband engine data processing system.

9. The computer program product of claim 1, wherein the computing device is a memory flow control unit associated with the synergistic processing unit.

10. An apparatus, comprising:
a synergistic processing unit;
a local storage coupled to the synergistic processing unit;
a memory flow controller coupled to the synergistic processing unit and the local storage, wherein the synergistic processing unit, the local storage, and the memory flow controller are comprised within a synergistic processing element and comprising a plurality of synergistic processing elements, wherein the synergistic processing element is one of a plurality of synergistic processing elements in a data processing system; and a local storage limit register coupled to the memory flow control unit, wherein the memory flow control unit:

sets a size limit value for each local storage in a shadow local storage limit register of an associated synergistic processing element, wherein the memory flow controller sets the size limit value for each local storage in the shadow local storage limit register of the associated synergistic processing element by:

receiving, in the memory flow controller of the associated synergistic processing element from a power processor element in the data processing system, an instruction to set the size limit value for the local storage;

storing the size limit value in a local storage limit register of a plurality of Memory Mapped I/O (MMIO) registers as a value specified by the instruction from the power processor element; and shadowing the size limit value stored in the local storage limit register to the shadow local storage limit register in the local storage;

receives a request to access the local storage of the associated synergistic processing element, wherein the request includes a request address;

compares the request address in the received request to the shadowed size limit value stored in the shadow local storage limit register of the associated synergistic processing element; and accesses the local storage of the associated synergistic processing element using an access address determined based on the comparison.

11. The apparatus of claim 10, wherein, if the request address is less than a maximum address of the local storage determined based on the size limit value, the memory flow control unit sets the access address as the request address.

12. The apparatus of claim 10, wherein, if the request address is not less than a maximum address of the local storage determined based on the size limit value, the memory flow control unit sets the access address as a modulo of the request address based on the size limit value.

13. The apparatus of claim 10, wherein the request address is a local storage address, and wherein the request is received from the synergistic processing unit associated with the local storage, and wherein the memory flow control unit compares the request address by comparing the local storage address to a maximum address for the local storage determined based on the size limit value.

14. The apparatus of claim 10, wherein the request address is an effective address, and wherein the request is received from a device external to the local storage and the associated synergistic processing unit.

15. The apparatus of claim 14, wherein the memory flow control unit further converts the effective address to a local storage address prior to comparing the request address to the size limit value and accessing the local storage, and wherein the comparing of the request address includes comparing the local storage address to a maximum address for the local storage determined based on the size limit value.

16. The apparatus of claim 10, wherein the local storage limit register is a privileged register that may only be written to by a power processor element of the data processing system.

17. The apparatus of claim 10, wherein the apparatus is part of a multiprocessor broadband engine data processing system.

18. The apparatus of claim 10, wherein each synergistic processing element in the plurality of synergistic processing elements further comprises a interface unit and wherein the interface unit comprises a direct memory access unit, a memory management unit, and a bus interface unit.

19. The apparatus of claim 10, wherein the power processor element comprises a processing unit, a level 1 cache, and a level 2 cache.

20. The apparatus of claim 10, wherein the power processor element is a dual threaded processing element.

* * * * *